G. H. MORROW.
SPRING COMPRESSOR.
APPLICATION FILED MAR. 14, 1917.
1,249,653.
Patented Dec. 11, 1917.
2 SHEETS—SHEET 1.
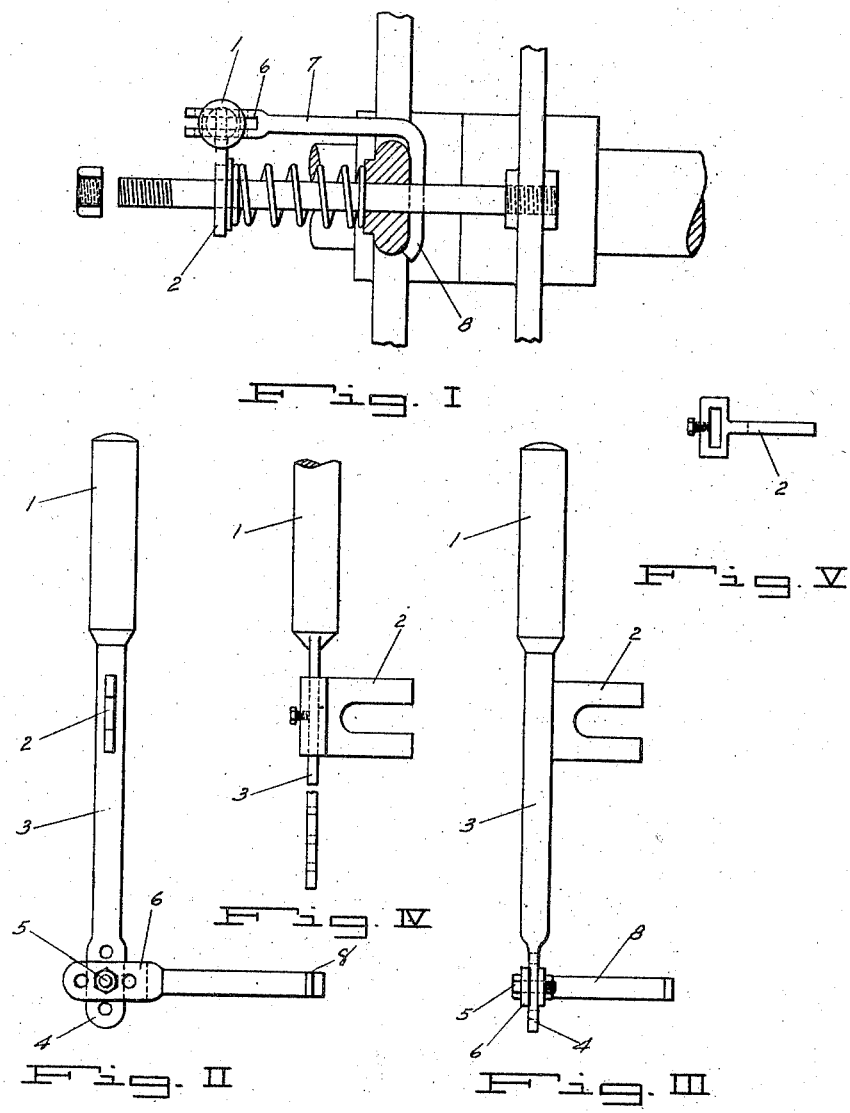
INVENTOR
George H Morrow
BY
David E Loftgreux
ATTORNEY G. H. MORROW.
SPRING COMPRESSOR.
APPLICATION FILED MAR. 14, 1917.
1,249,653.
Patented Dec. 11, 1917.
2 SHEETS—SHEET 2.
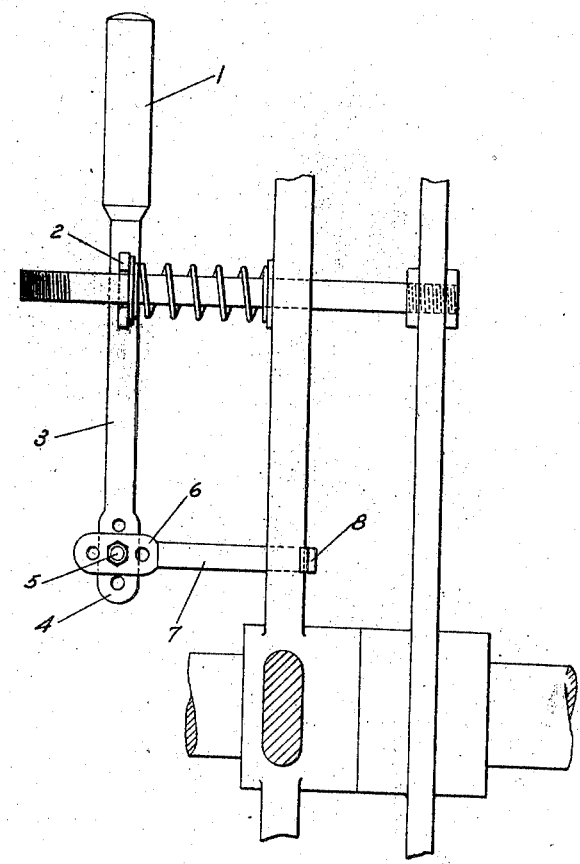
Fig. VI
INVENTOR
George H. Morrow
BY
David E. Lofgren
ATTORNEY

UNITED STATES PATENT OFFICE.

GEORGE H. MORROW, OF PORTLAND, OREGON.

SPRING-COMPRESSOR.

1,249,653.          Specification of Letters Patent.     Patented Dec. 11, 1917.

Application filed March 14, 1917. Serial No. 154,801.

*To all whom it may concern:*

Be it known that I, GEORGE H. MORROW, a citizen of the United States, residing at #5620 36th avenue southeast, Portland, in the county of Multnomah, State of Oregon, have invented new and useful Improvements in Spring-Compressors, of which the following is a specification.

My invention relates to a hand tool for compressing helical and flat springs, as is required to be done in assembling many and various types of machinery found in modern use; and the main object of my invention is to provide a means for compressing such springs conveniently, rapidly and with safety to workmen.

In compressing springs preparatory to securing in their home positions in various mechanical appliances, much difficulty is experienced owing to the usually limited working space, and the further necessity of superimposing the nut, pin, screw or other locking member upon the clamp, vise, lever or other compressing tool heretofore commonly used.

A further object of this invention is to produce a spring compressor of novel design which obviates the difficulties above enumerated.

My invention is susceptible of numerous applications and will be specifically described in connection with the accompanying drawings, in which Figure I illustrates the application to a clutch spring and Figs. II and III show side and front elevations of the tool respectively, while Figs. IV and V show a partial front elevation and plan of the adjustable wing respectively, in one of the many possible constructional modifications in which the principles of my invention may be embodied. Fig. VI is a plan view of the compressor applied to clutch spring.

Corresponding parts in the several figures are indicated by similar numerals of reference.

1— is a handle which may or may not be an integral part of the lever, 3— and may be either solid or tubular, according to convenience and cost of manufacturing. 3— is a specifically constructed lever, made of steel or other strong material, carrying either a stationary slotted wing, as shown at 2— of Figs. II and III or a movable winged sleeve as shown at 2— of Figs. IV and V, and a tenon provided with one or more holes as shown at 4.

The slotted wing, 2— may be forged out of the same stock as the lever, 3— or may be constructed as a projecting member of a sleeve through which the lever, 3— passes. The latter construction presupposes that the shape of the cross-section of the lever, 3— and the aforesaid sleeve, shall be complementary and such that relative rotation cannot take place, as, for instance a lever of rectangular cross-section passing through a rectangular sleeve, as shown in Fig. IV.

The position of the wing, 2— on the lever, 3— will be determined by the dimensions of the work to which the tool is applied.

The tenon, 4— on the lower end of the lever 3— is provided with several holes for adjusting the relative positions of 2— with respect to the fork, 6.

The fork, 6— carries an extension, 7— terminating in a hook, 8— substantially as shown in Fig. I. This fork also is drilled with extra holes so as to furnish a means for varying the distance between the tenon, 4— and the hook, 8— as shown in the side elevation, Fig. II.

The hook, 8, may be made in a variety of ways, the shape and size of which must be determined by the setting and dimensions of the spring to be compressed, but owing to the possible adjustments of my compressor, it will be found unnecessary to have more than one or two sizes in order to handle all cases likely to be encountered in practice.

In using my compressor, the distance between the fork and the slotted wing, 2— is adjusted to approximately the distance between the center of axis of the spring to be compressed and a firm hold on the spring seat. Likewise, the distance between the tenon, 4— and the hook 8— is adjusted to essentially the distance between the back of the spring seat, and the face of the compressed spring. The bolt 5— is then passed through the holes nearest these positions.

Since most springs are secured in position by a stay bolt passing through them, the slot is provided in the wing, 2— for admitting the bolt while the wing proper engages either the face of the spring or a washer resting thereupon as illustrated in Fig. I. The compression of the spring is affected by a lateral motion of the handle 1— to such a position that a locking nut, cotter-pin or other securing device may be adjusted for holding the spring, after which the open slot in the wing permits its withdrawal and the release of the compressor.

Having thus described my invention, what I claim is—

1. In a spring-compressor, in combination, a lever of the second class having a handle on one end, a slotted projection upon its side, and upon the other end a tenon, a fork pinned to said tenon and provided with a hook, essentially as specified.

2. In a spring-compressor, in combination, a lever of the second class, a slotted wing projecting laterally from said lever, a means for adjusting the effective length of said lever, a hook carrying a fork perforated for adjusting its length, pinned to said lever and movably disposed thereto, substantially as specified.

3. In a spring-compressor, in combination, a lever of the second class, a slotted wing carried by said lever, said lever having a perforated tenon at one end for adjusting its effective length, a forked member adjustably mounted on said tenon and provided with a means for anchoring to work, substantially as described.

4. In a spring-compressor, in combination, a lever having a perforated tenon at one end for adjusting its effective length, a sleeve having a slotted wing projecting laterally therefrom, said sleeve being slidably mounted on said lever and provided with a means for securing in any desired position thereon, and a forked member provided with a means for anchoring to work, adjustably mounted on said tenon, substantially as specified.

In witness whereof, I have hereunto signed my name.

GEORGE H. MORROW.

Copies of this patent may be obtained for five cents each, by addressing the "Commissioner of Patents, Washington, D. C."